United States Patent Office 3,798,108
Patented Mar. 19, 1974

---

3,798,108
APPARATUS FOR DISPENSING TAPE
Joseph R. Ioannilli, Beverly, Mass., assignor to USM
Corporation, Boston, Mass.
Filed Dec. 20, 1971, Ser. No. 209,939
Int. Cl. B32b 31/00; B26d 7/06
U.S. Cl. 156—510               4 Claims

ABSTRACT OF THE DISCLOSURE

An apparatus for dispensing tape comprises means for feeding the tape having the backing temporarily attached to a separator which separates the tape from the backing. The tape is then directed toward a dispensing area portion of the apparatus and the backing is fed into means for pulling the backing. The pulling means are then activated to feed tape onto the dispensing portion of the apparatus and cutting means are activated to cut a piece of the tape on the dispensing portion for use.

BACKGROUND OF THE INVENTION

Tapes having a continuous backing temporarily secured to the tape are well known. Frequently, the tape has a pressure sensitive adhesive to which a release paper is temporarily secured to form a backing temporarily attached to the tape. The release paper backing serves to protect the adhesive and permit the tape to be rolled on itself without having the adhesive stick to the tape. Such release papers are particularly important where the adhesive adheres more strongly than the tear strength of the tape thus making it difficult or impossible to remove the tape from an object to which the adhesive on the tape has adhered. One such tape is a delicate metallic foil.

Two types of dispensers are known for use with tape having a backing. One type dispenses the tape with the backing material attached. The backing material is then manually removed before the tape is used. Such manual removal of the backing material is too slow for industrial use. Another type of dispenser removes the backing material before the tape is engaged by means for moving the tape to a dispensing area portion of the dispenser. Where pressure sensitive adhesive is on the tape the means for moving the tape either avoid contacting the adhesive or contact the adhesive with a member treated with a release agent to which the adhesive will not adhere.

Tape moving means which contact only a non-adhesive side of the tape may be a wheel which rotates teeth into engagement with non-adhesive coated portions of the tape to move the tape. Where the tape is delicate, the teeth may damage the tape. Tape moving means which are provided with a release agent must have the agent periodically renewed to continually prevent the adhesive from adhering to the moving means. In addition, small quantities of adhesive frequently adhere to the moving means in spite of the release agent and, with continued use of the dispenser, accumulate sufficiently to permit the tape to improperly adhere to the moving means. Similarly, dirt and debris collect on the adhesive on the moving means and may interfere with operation of the dispenser.

The problems associated with the use of both types of dispensers are particularly acute where it is desired to rapidly dispense small pieces of tape. For example, most commercial tape dispensers will not dispense pieces of tape less than one quarter inch long.

SUMMARY OF THE INVENTION

Accordingly it is an object of the invention to provide an apparatus for quickly dispensing small pieces of delicate tape having a continuous backing temporarily attached to the tape.

To this end the method practiced by the invention comprises the steps of feeding tape and temporarily attached continuous backing to a separator which separates the backing from the tape. From the separator the tape is directed toward a dispensing area and the backing is fed into means for pulling the backing. The pulling means is then activated to pull the backing away from the separator. Pulling the backing advances the tape attached to the backing toward the separator which pushes the tape already separated from the backing onto the dispensing area. The backing need be continuous and attached to the tape only to advance the tape when the backing is pulled. Cutting means then cut a piece of tape in the dispensing area for use.

Novel apparatus for dispensing the tape according to the method comprises means for feeding the tape and attached backing to a separator which separates the backing from the tape. After passing through the separator, the tape is directed toward a dispensing area portion of the apparatus and the backing is fed into means for pulling the backing. The pulling means are then activated to pull the attached backing and tape toward the separator and push the tape separated from the backing onto the dispensing area portion of the apparatus. Means for cutting the tape on the dispensing area portion are then activated to provide a piece of tape for use.

DESCRIPTION OF THE DRAWINGS

A preferred embodiment of the invention which is intended to be illustrative of and not a limitation on the invention will now be more particularly described with reference to the drawings, in which.

DESCRIPTION OF PREFERRED EMBODIMENT

Figure 1:
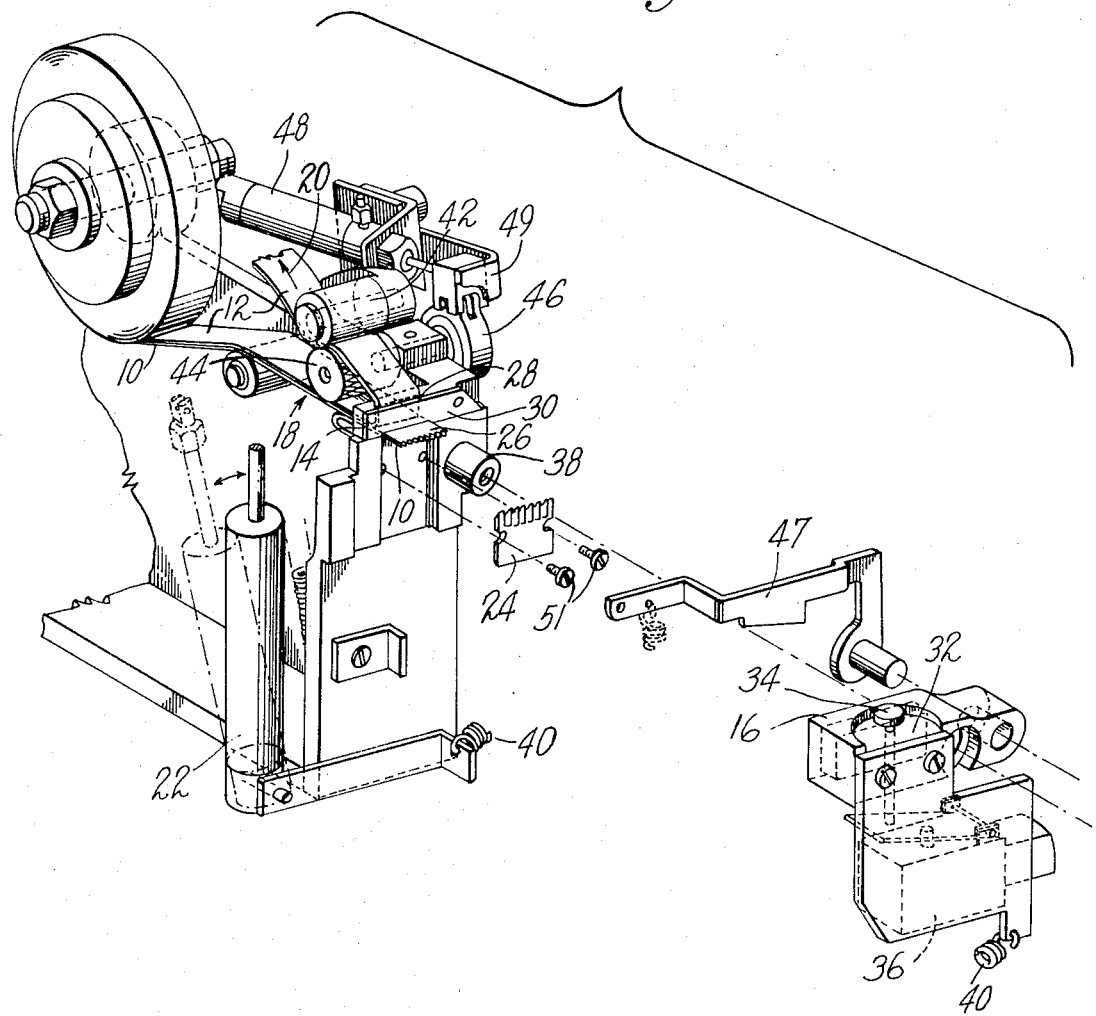
FIG. 1 is an exploded perspective view of the apparatus.
Figure 2:
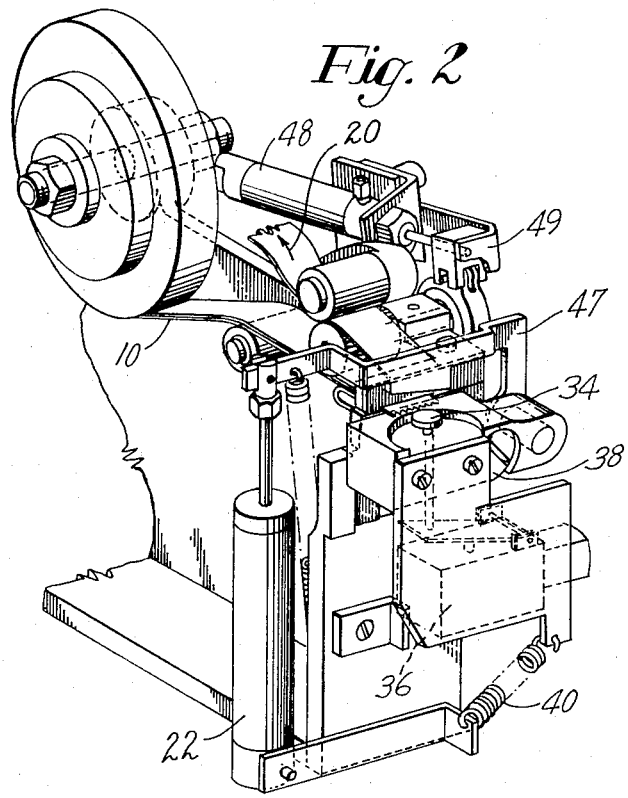
FIG. 2 is a perspective view of a portion of the apparatus shown in FIG. 1.

As seen in FIG. 1 a preferred embodiment of the invention comprises a support for a role of tape 10 having a continuous backing 12 temporarily secured to the tape. The tape and backing are fed to a separator 14 which separates the backing from the tape. After separation, the tape is directed toward a dispensing area portion 16 of the apparatus and the backing is fed to a pulling means generally at 18. The pulling means periodically advances the backing in the direction shown by arrow 20 which is generally away from the separator. Advancing the backing away from the separator pulls the tape secured to the backing toward the separator and pushes the separated tape onto the dispensing area portion. When a desired length of tape has been fed onto the dispensing portion, piston and cylinder 22 is activated to operate the cutting means which also includes a knife 24. The cutting means cuts a piece of tape on the dispensing area portion from the remaining tape for use.

The tape 10 preferably comprises a relatively thin and delicate material having a pressure sensitive adhesive on a side 26 which temporarily secures the tape to the backing. The adhesive side 26 of the tape is also an exposed side of the tape on the dispensing area portion 16. To insure that the backing is only temporarily secured to the tape by the adhesive, the backing is made from a release material, such as silicone treated paper, which only lightly adheres to the adhesive. The backing also permits the tape to be wound upon itself without having the adhesive adhere to the tape and additionally serves to protect the adhesive from foreign material prior to its use.

The separator 14 has a slot 28 through which the backing is fed. The backing is then fed toward the pulling means or upwardly as seen in FIG. 1. The tape is directed toward the dispensing area portion 16, or straight ahead as seen in FIG. 1. The backing is thus separated from the tape. To insure proper separation of the backing from the tape, a plate 30 is pivotally connected to the separator in front of the backing and above the tape as seen in FIG. 1. The pivotal connection facilitates inserting the backing in the separator. If the tape starts to follow the backing up the separator, it contacts the plate 30 and is restrained from such movement. Preferably the plate 30 is made from a material to which the adhesive on the tape will not adhere so as to avoid fouling the apparatus by adhering the tape to the plate.

Figure 4:
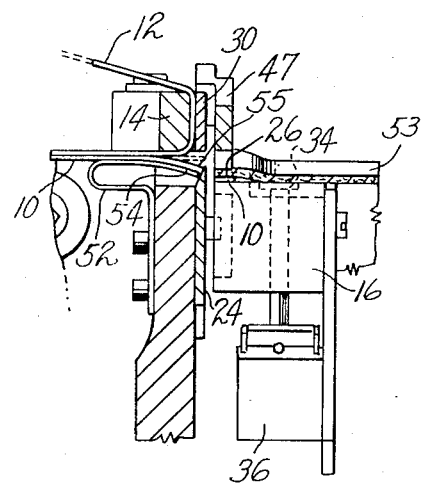
FIG. 4 is a side view of a portion of the apparatus shown in FIG. 3 with the cutting means in a different position.

The dispensing area portion 16 has a recessed portion 32 adjacent the edge farthest from the separator. A button 34 projects from the recess and is connected to a switch 36 for activating the cutting means. As seen in FIG. 4, the button is so placed that a workpiece inserted in the dispensing area portion will contact the button 34 to operate the switch to activate the cutting means to apply a piece of tape to the workpiece. The dispensing area portion is mounted on pivot 38 for rotation about the pivot. The dispensing area portion is also connected to spring 40 which is also connected to a frame of the machine to resiliently maintain the dispensing area portion in a plane parallel to and engaging a plane of the tape 10 on the dispensing area portion. The tape is thus supported on the dispensing area portion prior to being cut for use.

The pulling means 18 comprises rollers 42 and 44 rotatably mounted on a frame of the machine and in driving engagement with the backing. Roller 44 is connected to a rotary to linear motion converting rachet 46 in adjustable operating engagement with a piston and cylinder 48 for adjustable and incrementally rotating roller 44 only in a counter-clockwise direction as seen in FIG. 1. Rotation of roller 44 advances the backing in driven engagement with the rollers away from the separator. A stop 49 is adjustably connected to a frame of the apparatus and engages piston and cylinder to adjustably terminate its stroke to adjust the incremental rotation of roller 44. The switch 36 is effective to operate the piston and cylinder 48 for advancing the backing in timed relation to and after piston and cylinder 22 has been activated to operate the cutting means.

Figure 3:
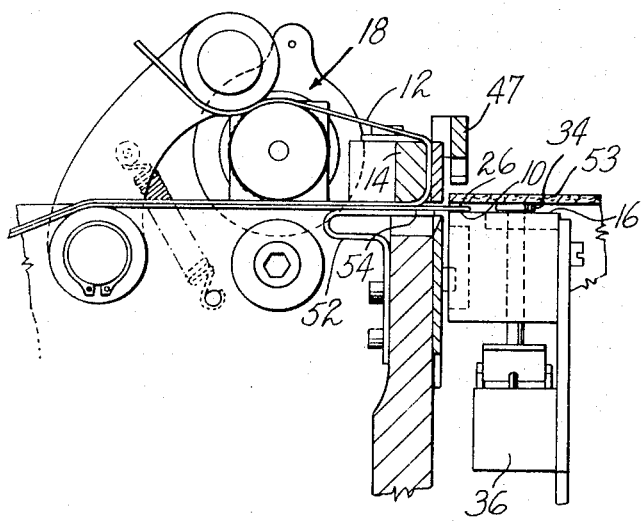
FIG. 3 is a side view of a portion of the apparatus shown in FIG. 1.

The cutting means comprises the knife 24 secured, as by bolts 51, to a frame of the apparatus between the separator 14 and the dispensing area portion 16 and in close proximity to the portion of the tape 10 directed toward the dispensing area portion after separation from the backing. As best seen in FIG. 3, a cutting edge of the knife is in spaced alignment with the dispensing area portion before cutting the tape.

Piston and cylinder 22 is pivotally connected to one end of a hammer 47. The other end of the hammer is pivotally secured to the dispensing area portion. Operation of piston and cylinder 22, effected by the switch 36, rotates the hammer toward the dispensing area portion 16 or counter-clockwise as seen in FIG. 1. As seen in FIG. 4, the hammer rotates into engagement with a workpiece 53 on the dispensing area portion and firmly presses the workpiece against the adhesive side 26 of the tape 10. The pressure sensitive adhesive on the tape secures the tape to the workpiece. The hammer continues to press the workpiece and tape against the dispensing area portion 16 which resiliently yields against the action of spring 40 to rotate the dispensing portion several degrees about its pivot 38. The tape and workpiece are carried between the hammer and dispensing area portion as they rotate together to drive the tape 10 against a cutting edge of the knife 24 to cut the tape.

After completing a predetermined stroke the piston and cylinder automatically returns the hammer to its original position in alignment with the separator. The workpiece and cut, attached piece of tape may then be removed for use.

As the tape is carried against the cutting edge of the knife 24 by rotation of the hammer and dispensing area portion to cut the tape, a cut end 55 of the tape on the opposite side of the knife from the dispensing area portion may be driven or curled behind the knife. Subsequent activation of the pulling mechanism to push a further piece of tape onto the dispensing area portion will then inappropriately buckle the tape against the knife or otherwise fail to properly push the tape onto the dispensing area portion. Tape materials which are not elastic so as to return to their initial unbent and uncurled postion, such as metallic foil, are particularly subject to jamming against the knife after a cut is made. The cutting means is therefore provided with a device 52 shown in FIGS. 3 and 4 for redirecting the tape adjacent the knife for movement onto the dispensing area portion 16. The device comprises a supporting surface 54 adjacent the knife for supporting the tape for movement onto the dispensing area portion. The device 52 is secured to a frame of the apparatus and yields under tape pressure so that the hammer 47 of the cutting mechanism can drive the tape against the cutting edge of the knife. When the knife cuts the tape, the pressure of the tape on the supporting surface is released and the device resiliently returns the supporting surface to its original position in spaced alinement with the knife edge as best seen in FIG. 3 to support and redirect the tape adjacent the knife for movement onto the dispensing area portion. Activation of the pulling means is then effective to push tape onto the dispensing area portion.

Having thus described my invention what I claim as new and desire to secure by Letters Patent of the United States is:

1. Apparatus for dispensing a tape having a continuous backing temporarily attached to the tape, comprising: a separator for separating the backing from the tape; means engaged with the separated backing for pulling the backing to advance the tape; a dispensing area portion for receiving the advance tape; a fixed knife between the separator and the dispensing area portion and having an edge for cutting a piece of the advanced tape on the dispensing area portion from the tape for use; means for activating the pulling means; and means for cutting the tape on the knife edge.

2. Apparatus as in claim 1 wherein the means for cutting the tape comprises a hammer for engaging the tape on the dispensing area portion and wherein the dispensing area portion resiliently yields relative to the knife when the hammer engages the tape for cutting it.

3. Apparatus as in claim 1 and additionally comprising means for redirecting the tape toward the dispensing area portion after the cutting means cuts the tape, the redirecting means being resiliently yieldable to movement of the tape during cutting.

4. Apparatus as in claim 3 wherein the tape redirecting means has a tape-supporting surface adjacent the knife.

References Cited

UNITED STATES PATENTS

| | | | |
|---|---|---|---|
| 3,468,743 | 9/1969 | Soriano | 156—584 |
| 3,450,590 | 6/1969 | La Mers | 156—584 |
| 2,043,554 | 6/1936 | Potdevin | 83—566 |
| 3,668,047 | 6/1972 | Heller | 156—584 |

DOUGLAS J. DRUMMOND, Primary Examiner

U.S. Cl. X.R.

83—134, 566, 649; 156—584